United States Patent
Sauve

[11] Patent Number: 5,938,269
[45] Date of Patent: Aug. 17, 1999

[54] FLOOR COVERING ASSEMBLY AND METHOD

[75] Inventor: Paul J. Sauve, Warren, Mich.

[73] Assignee: DaimlerChrysler Corporation, Auburn Hills, Mich.

[21] Appl. No.: 08/723,401

[22] Filed: Sep. 30, 1996

[51] Int. Cl.⁶ ..................................................... B60N 3/04
[52] U.S. Cl. ............................ 296/97.23; 296/39.1; 16/7; 49/467
[58] Field of Search ................ 296/97.23, 39.1; 16/4, 6, 7; 49/467; 428/122

[56] References Cited

U.S. PATENT DOCUMENTS

| | | | |
|---|---|---|---|
| 2,114,344 | 4/1938 | Haberstump . | |
| 2,281,586 | 5/1942 | Kramer . | |
| 2,313,812 | 3/1943 | Duffy | 296/209 |
| 2,862,227 | 12/1958 | Larabell | 16/4 |
| 3,622,195 | 11/1971 | Lautenbach . | |
| 4,033,011 | 7/1977 | Endo et al. | 16/4 X |
| 4,054,698 | 10/1977 | Hamrah | 428/40 |
| 4,187,656 | 2/1980 | Lutz . | |
| 4,214,036 | 7/1980 | Bright | 428/358 |
| 4,481,240 | 11/1984 | Roth . | |
| 4,751,764 | 6/1988 | Reuben | 16/8 |
| 4,759,096 | 7/1988 | Dorris | 16/7 X |
| 4,875,250 | 10/1989 | Chaintreuil | 16/7 X |
| 4,921,742 | 5/1990 | Altus | 428/81 |
| 5,015,034 | 5/1991 | Kindig et al. . | |
| 5,111,619 | 5/1992 | Billin et al. | 49/502 |
| 5,192,599 | 3/1993 | Sakamoto | 428/82 |
| 5,288,121 | 2/1994 | Graves | 296/97.23 |
| 5,658,046 | 8/1997 | Rus | 16/4 X |

*Primary Examiner*—Dennis H. Pedder
*Attorney, Agent, or Firm*—Roland A. Fuller, III

[57] ABSTRACT

A floor covering assembly and method for use in an interior compartment of an automotive vehicle includes a floor covering having a sill trim attached thereto. The floor covering assembly is prefabricated, thus it forms a unitary, modular assembly which may be easily installed in the interior of the vehicle in a timely and efficient manner. The floor covering assembly includes a sill trim having a U-shaped channel which accepts a leading edge of the floor covering. The floor covering is then wrapped around at least one surface of the sill trim and secured thereto by a suitable adhesive. A staple or other fastening mechanism may also be used to further secure the floor covering to the sill trim.

13 Claims, 1 Drawing Sheet

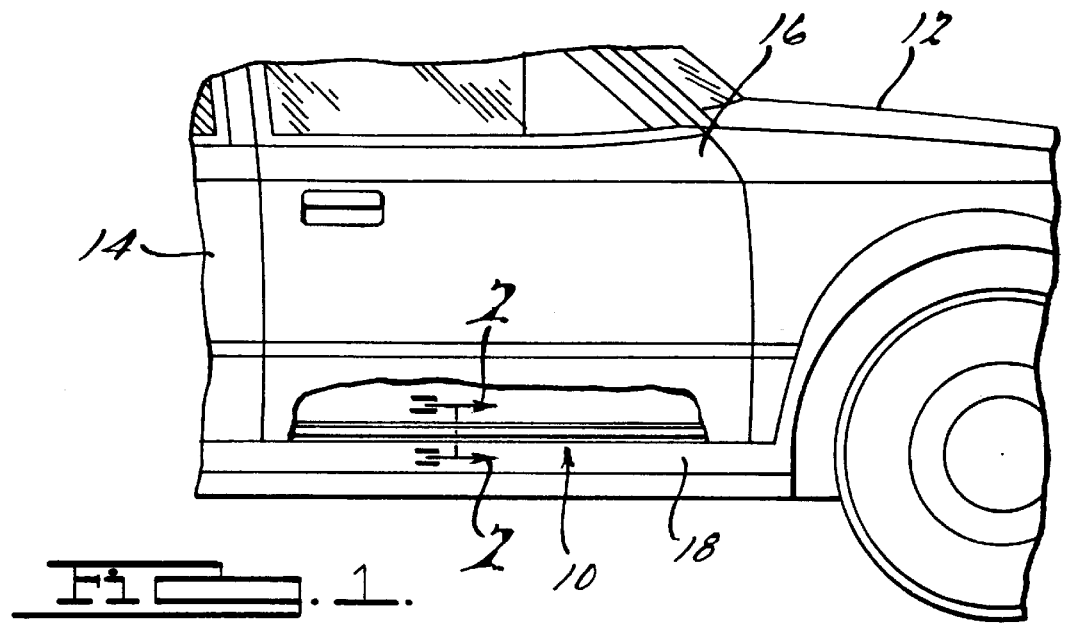
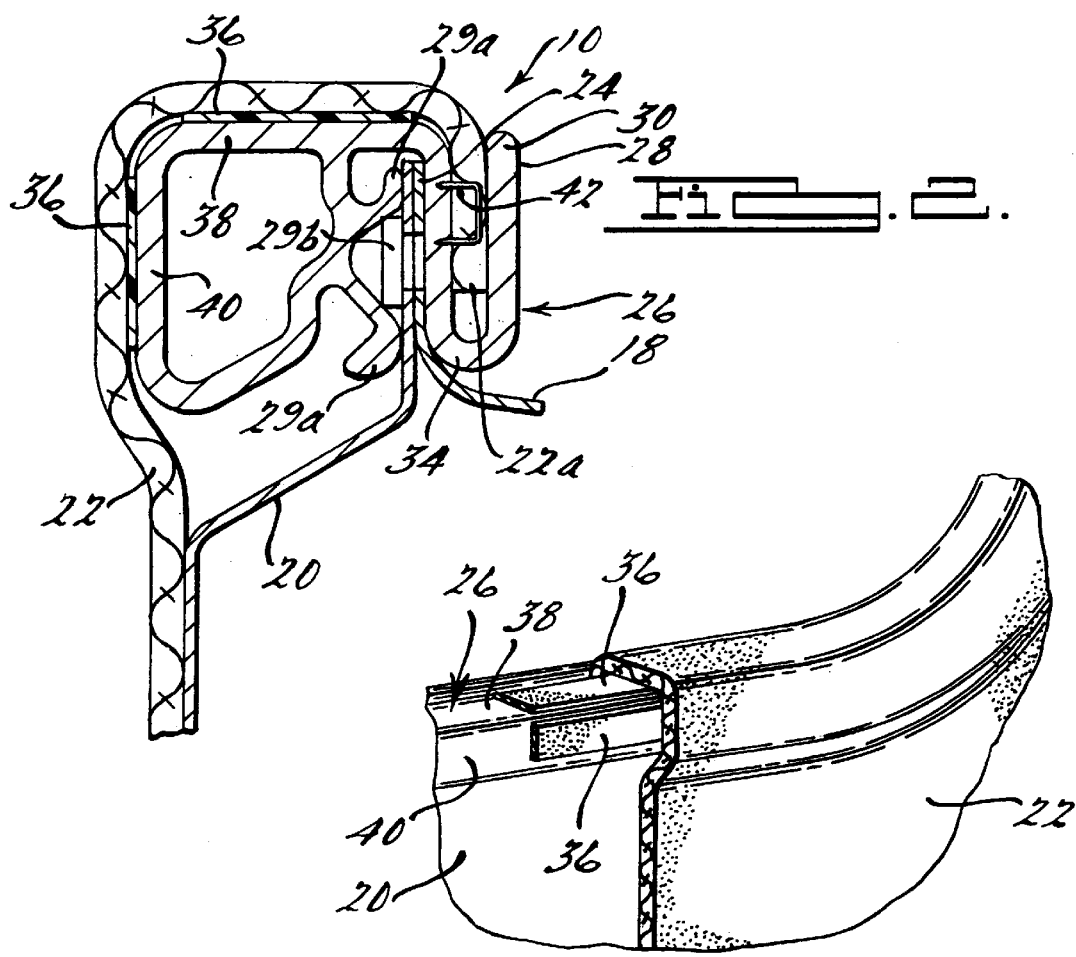

FLOOR COVERING ASSEMBLY AND METHOD

BACKGROUND OF THE INVENTION

1. Field of the Invention

The present invention relates generally to a floor covering assembly for use in an interior compartment of an automotive vehicle and, more particularly, to a floor covering assembly and method for forming including a sill trim attached thereto to facilitate installation of the assembly as a module in the interior compartment of the automotive vehicle.

2. Description of the Related Art

Modern automotive vehicles are formed of a vehicle body construction wherein a body tub or floor pan of an automotive vehicle is joined to a rocker panel. The joined area runs along a lower edge of a door opening and is typically termed a "sill". Sill trim is normally placed over the sill to provide a finished edge.

In some instances, the sill trim is used to secure the floor covering, typically a carpet, adjacent the lower edge of the door opening. In other instances, the carpet is positioned adjacent the sill. Typically, the sill trim is connected to the sill, normally with threaded fasteners, such that tightening the fasteners secures the carpet in place by sandwiching the carpet between the sill trim and the body tub of the automotive vehicle.

One disadvantage of the above is that the carpet and sill member are separate pieces resulting in additional time for construction and assembly. Another disadvantage is that the use of sill trim separate from the floor covering or carpet results in a joint between the sill trim and the carpet which reduces vehicle aesthetics and is undesirable.

SUMMARY OF THE INVENTION

It is, therefore, one object of the present invention to provide a floor covering assembly including a sill trim attached thereto.

It is another object of the present invention to provide a floor covering assembly wherein the floor covering and sill trim piece are combined into a unitary, modular member for installation in a body tub or floor pan of an automotive vehicle.

It is yet another object of the present invention to provide a floor covering assembly which is easily attached to the sill trim to eliminate a visible joint between the sill trim and the floor covering.

It is a further object of the present invention to provide an assembly which reduces installation time of the floor covering and sill trim.

To achieve the foregoing objects, the present invention is a floor covering assembly for installation in a body tub or floor pan of an automotive vehicle wherein the body tub or floor pan intersects a rocker panel of the automotive vehicle to form a sill. The floor covering assembly includes a one piece floor covering and a sill trim configured for attachment to the sill. The floor covering is attached to and covers a portion of the sill trim and extends from the sill trim to the body tub without any discontinuities or joints to form a unitary floor covering assembly.

One advantage of the present invention is that a floor covering assembly is provided as a one piece or modular assembly combining the floor covering and sill trim. Another advantage of the present invention is that the floor covering assembly reduces final vehicle assembly time as the overall installation procedure is simplified by reducing the number of components which must be installed during final vehicle assembly. A further advantage of the present invention is that the assembly of the floor covering and sill trim is completed off site; i.e., the floor covering assembly is assembled and shipped as a unitary member or module for installation in the automotive vehicle body tub or floor pan by the automotive vehicle manufacturer.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a fragmentary elevational view of an automotive vehicle having a floor covering assembly according to the present invention.

FIG. 2 is an enlarged sectional view taken along line 2—2 of FIG. 1.

FIG. 3 is a fragmentary perspective view of the floor covering assembly illustrated in FIG. 1 with portions removed for clarity.

DESCRIPTION OF THE PREFERRED EMBODIMENT(S)

Referring to FIG. 1, a floor covering assembly 10, according to the present invention, is illustrated in operational relationship with an automotive vehicle 12. The automotive vehicle 12 includes a vehicle body 14 having a door 16 to allow ingress and egress to an interior compartment (not shown) of the vehicle 12. The automotive vehicle 12 also includes a rocker panel 18 forming the lower portion of the vehicle body 14. The automotive vehicle 12 further includes a body tub or floor pan 20 (FIG. 3) which forms the lower surface of the interior compartment. The automotive vehicle 12 includes a floor covering 22 to cover the body tub or floor pan 20. Preferably, the floor covering 22 is a carpet molded in a shape corresponding to the shape of the body tub 20.

Referring to FIGS. 2 and 3, a joint between the rocker panel 18 and body tub 20 forms a sill 24. The sill 24 is normally covered by sill trim 26, which as shown in FIG. 2 is placed over and attached to the sill 24 via several detent legs 29a which extend over rivets 29b used to connect the rocker panel 18 to the body tub 20. It should be appreciated that other connection mechanisms may be used to secure the sill trim 26 the sill 24.

The floor covering assembly 10, according to the present invention, includes the floor covering 22 attached to the sill trim 26 to form a single, unitary assembly. The floor covering assembly 10 includes an outward or leading edge 22a of the floor covering 22 disposed within a U-shaped channel 28 of the sill trim 26. The U-shaped channel 28 is formed of an exterior leg 30 and an interior leg 32 joined together at a base 34 of the U-shaped channel 28. Adhesive 36 is placed along an upper surface 38 and a side surface 40 of the sill trim 26. After the leading edge 22a of the floor covering 22 is secured in the U-shaped channel 28, the floor covering 22 is then wrapped around the upper surface 38 and side surface 40 of the sill trim 26. Once wrapped, the floor covering 22 is pressed onto the adhesive 36 to secure the floor covering 22 to the sill trim 26.

Preferably, the adhesive 36 is formed as a two-sided adhesive layer such as double sided tape having a backing on one side thereof. Prior to attachment of the floor covering 22, the tape is applied to the sill trim 26. To attach or secure the floor covering 22, the backing is removed to expose the adhesive 36. Once the backing is removed, the floor covering 22 is wrapped around the sill trim 26 and is secured to the adhesive 36 using pressure. Pressure is applied through a manual operation, typically through use of a rubber roller.

An additional securing mechanism can be used to further secure the floor covering 22 to the sill trim 26. One example of a securing mechanism includes the use of staples 42. As shown in FIG. 2, staples 42 may be driven through the floor covering 22 into the sill trim 26. When used, the staples 42 are normally placed in the U-shaped channel 28 where they will be hidden from view. Stapling the floor covering 22 to the sill trim 26 is accomplished by manually pulling the exterior leg 30 outward to expose the surface of the floor covering 22. At least one staple 42 is then driven through the floor covering 22 into the interior leg 32 of sill trim 26 to secure the leading edge 22a of the floor covering 22 within the U-shaped channel 28. After the staples 42 are inserted, the exterior leg 30 is released and as a result of the resiliency of the sill trim 26 material the exterior leg 30 snaps back into place thus covering the staples 42 and hiding it from view.

It should be appreciated that once the sill trim 26 is attached to the floor covering 22, the entire assembly forms a unitary floor covering assembly which can be easily installed in a modular form into the interior compartment of an automotive vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended Claims, the present invention may be practiced other than as specifically described. adhesive secures said floor covering to said sill trim.

What is claimed is:

1. A floor covering assembly for installation in a body tub of an automotive vehicle wherein the body tub intersects a rocker panel of the automotive vehicle to form a sill comprising:
    a one-piece floor covering;
    a sill trim having an attachment portion for attachment to the sill, said attachment portion including a U-shaped channel positioned on one side of said sill and a detent leg positioned on an opposite side of said sill wherein said detent leg cooperates with said U-shaped channel to attach said sill trim to said sill; and
    adhesive means for adhesively securing said floor covering to a portion of said sill trim such that said floor covering extends from said sill trim to said body tub without any discontinuity to form a unitary floor covering assembly.

2. A floor assembly as set forth in claim 1 wherein said floor covering includes a leading edge and said U-shaped channel is formed by an interior leg and an exterior leg joined together by a base such that said leading edge of said floor covering is disposed and secured within the U-shaped channel.

3. A floor covering assembly as set forth in claim 1 wherein said adhesive means comprises an adhesive positioned on an upper surface and a side surface of said sill trim wherein said adhesive secures said floor covering to said sill trim.

4. A floor covering assembly as set forth in claim 3 wherein said adhesive is a adhesive tape.

5. A floor covering assembly as set forth in claim 4 wherein said adhesive tape is a two-sided tape having an adhesive layer on both sides, one side thereof including a backing wherein said backing is removable to expose and adhere said adhesive layer against said floor covering.

6. A floor covering assembly as set forth in claim 2 including staples extending through said floor covering into said interior leg of said U-shaped channel.

7. A floor covering assembly as set forth in claim 2 wherein said exterior leg being outwardly deflectable to expose said leading edge of said floor covering.

8. A floor covering assembly as set forth in claim 1 wherein said floor covering and said sill trim are connected such that the combination forms a one piece, unitary, module for installation in the body tub of the automotive vehicle.

9. A floor carpet assembly for installation as a unitary member in a body tub of an automotive vehicle wherein the body tub intersects with a rocker panel of the automotive vehicle to form a sill comprising:
    a one piece floor covering including a leading edge;
    a sill trim having an attachment portion for attachment to the sill, said sill trim including an upper surface and a side surface and a U-shaped channel including an interior leg and an exterior leg, wherein said leading edge is positioned in said U-shaped channel;
    an adhesive positioned on at least one of said upper and side surfaces, said floor covering extending from said U-shaped channel over said upper surface and said side surface and secured to the sill trim by said adhesive; and
    staples extending though said floor covering and into said interior leg of said sill trim wherein said floor covering extends from said sill trim to said body tub without any discontinuity to form a unitary, floor covering assembly.

10. A method for forming a one-piece floor covering assembly for installation in a body tub of an automotive vehicle comprising:
    forming a floor covering assembly in a shape to match a shape of the body tub;
    forming a sill trim having an attachment portion including a U-shaped channel formed of an interior leg and an exterior leg interconnected by a base portion and providing a detent leg connected to said sill trim and spaced from said interior leg for attachment to a sill on the body tub of the automotive vehicle;
    interconnecting the sill trim with the floor covering by placing an adhesive on the sill trim, inserting a leading edge of the floor covering into a U-shaped channel on the sill trim and wrapping the floor covering about a portion of the sill trim such that the floor covering contacts the adhesive and the adhesive adheres to the floor covering and secures the floor covering to the sill trim to form a one-piece, modular assembly which is then installed in a single operation in the body tub of the automotive vehicle and
    installing said sill trim on said sill by positioning said sill trim over said sill. and pushing said sill trim onto said sill such that said sill is sandwiched between said detent leg and said interior leg of said U-shaped channel.

11. A method as set forth in claim 10 wherein said step of interconnecting the floor covering to the sill trim includes the step of positioning a leading edge of the floor covering in said U-shaped channel of the sill trim.

12. A method as set forth in claim 10 wherein said step of connecting the floor covering to the sill trim includes the step of inserting a fastener through the floor covering into the sill trim to secure the floor covering to the sill trim.

13. A method for forming a one-piece floor covering assembly for installation in a body tub of an automotive vehicle comprising:

forming a floor covering assembly in a shape corresponding to a shape of the body tub;

forming a sill trim having an attachment portion for attachment to a sill on the body tub of the automotive vehicle;

interconnecting the sill trim with the floor covering such that the floor covering wraps about the sill trim to form a one piece, modular assembly which is then installed in a single operation in the body tub of the automotive vehicle;

said step of connecting the floor covering to the sill trim including the step of inserting a fastener through the floor covering into the sill trim to secure the floor covering to the sill trim; and said step of inserting a fastener includes the step of outwardly deflecting an exterior leg of a U-shaped channel of the sill trim, inserting staples through the floor covering into an interior leg of the U-shaped channel of the sill trim and releasing the exterior leg such that it snaps back into position and covers the staple.

* * * * *